Patented Dec. 4, 1951

2,577,211

UNITED STATES PATENT OFFICE 2,577,211

TREATMENT OF PROCESSED PICKLES

Murray M. Scharf, Bellwood, Ill.

No Drawing. Application December 13, 1949,
Serial No. 132,792

7 Claims. (Cl. 99—168)

My invention relates to the treatment of processed pickles. By the term "processed" pickles, I mean pickles or cucumbers which, during at least a part of their processing, have undergone subjection to a common salt brine solution, or to a solution containing common salt, for a period of time sufficient to cause chemical change in the pickles, notably a breakdown of a part of the carbohydrate content thereof accompanied by gas evolution, commonly, carbon dioxide, and formation of lactic acid or acetic acid or alcohol or mixtures thereof. Typical examples of processed pickles are dill pickles, "kosher" dill pickles, sweet pickles, and sour pickles.

Processed pickles are conventionally packed and shipped in brine solutions and this is true whether the packaging is in glass jars, wooden barrels, or other types of containers. Packaging in glass jars is relatively expensive; and, while packaging in wooden barrels is substantially less costly, a practice more commonly adopted in the case of "kosher" dill pickles, the pickles have a definite tendency to deteriorate and become soft and soggy after a period of time, this being independent of the lack of cleanliness in handling which this practice brings about. Even in the case of glass-packed dill pickles, for example, appreciable deterioration not infrequently occurs in approximately six months or somewhat longer.

In accordance with my invention, processed pickles are treated in a manner such as to obviate a number of objections which, so far as I am aware, have always existed with respect to the packaging and shipping of processed pickles.

I have discovered that if a processed pickle is encased in a layer or coating of a water-insoluble, water-impervious waxy coating of a thickness or character such as substantially to inhibit "breathing," the pickle will not only keep for prolonged periods of time but the maintenance of its crispness is enhanced. In addition, it may be packaged in ordinary paperboard boxes or bags and sold as such, thus very materially reducing the cost of packaging and shipment. Various other advantages of substantial commercial significance will be pointed out hereafter in connection with the detailed description of the invention which follows.

In the particularly preferred aspects of my invention, the processed pickles are coated with, or encased entirely within a sheath of, a wax or a coating composition comprising a wax or mixture of waxes blended with other materials to alter to the desired extent the physical properties of the wax selected.

Among the waxes and waxy materials which may be employed are, for example, paraffin waxes of low, intermediate and relatively high melting point, including, for example, those having melting temperatures in the range of about 130 to 195 degrees F.; carnauba wax, candellila wax, beeswax, ceresin, spermaceti, stearin, stearic acid, stearic acid monoethanolamide, monostearin; hard hydrogenated oils and fats, that is, hydrogenated oils and fats hydrogenated to a sufficient extent to raise their melting points to at least about 140° F. and preferably higher. It will be appreciated, of course, that the waxes or waxy materials utilized should be nontoxic. They may be of animal, vegetable or mineral origin as well as of synthetic character. Mixtures of waxes or waxy materials may, of course, be employed, and supplemental agents, such as substances having plasticizing properties, may be incorporated to reduce brittleness if that happens to be a characteristic of any particular waxy material selected for use. Numerous commercial waxy compositions are available as well as the "straight" waxes. Typical of such commercial waxy compositions is a yellow cheese wax with good flexibility sold under the trade name "Candy" yellow cheese wax. The waxy coating compositions should, of course, be so selected as to have a melting or softening temperature in excess of the highest temperatures which may be encountered in shipping or storage operations.

In carrying out my invention, the processed pickles, preferably free of adhering water or brine or the like, are placed in a tank or vat containing the molten wax or waxy coating composition. The temperature of the wax coating both may be maintained slightly above the solidification temperature of said coating material or, in certain instances, depending among other things on the nature of the waxy coating composition, it may be maintained at materially higher temperatures, for example, at 210 to 225 degrees F. In the case of the aforementioned "Candy" yellow cheese wax, a good operating temperature is 140 to 150 degrees F. The processed pickles are allowed to remain in the coating bath for a few seconds up to several minutes or more. A period of about 5 to 10 seconds is usually adequate. Upon removal of the processed pickles from the coating bath, the waxy coating solidifies. I prefer, however, to spray the processed pickles with cold water after they emerge from the coating bath in order quickly to congeal the coating. I find it advantageous to form a plurality of coatings on the processed pickles, two or three coatings being particularly preferred, and, to this end, after each coating operation, the previously coated processed pickles are dipped into waxy coating baths advantageously maintained at temperatures only slightly above the temperature of solidification of the waxy coating material and allowed to remain in such secondary and/or subsequent waxy coating baths for only a few seconds. While the thickness of the waxy coating on the processed pickle is somewhat variable, it is in all cases appreciable, so as to prevent or substantially inhibit "breathing" since otherwise deterioration of the processed pickle takes place in a relatively very short period of time. In general, good results are obtained with thicknesses ranging from about 1/25" to about 1/16". It will be appreciated, of course, that the coating operation may be carried out in a batch or continuous procedure.

I am, of course, aware of the well known practice of coating various food products with waxes and the like to effect preservation thereof and for other purposes, a typical example being the coating of oranges and other citrus fruits with paraffin wax as well as with other waxes or blends of different waxes. In general, such coatings are made as thin as is feasibly possible and they are subjected to a polishing operation to impart a polish or lustre to the fruit. I have found that, when coatings of the character and thicknesses with which I am concerned are applied, for example, to fresh pickles or cucumbers, a most peculiar result occurs. The wax coating not only does not serve to effect preservation of the fresh pickles or cucumbers but, rather causes just the opposite effect. In other words, if a fresh pickle or cucumber is coated with wax so as to encase the same completely or substantially completely in a coating of appreciable thickness, after even so short a period as about two days or less, the fresh pickle or cucumber undergoes marked chemical and/or physical change, the interior thereof becoming "liquefied" and, accordingly, spoiled or useless and unsalable. Surprisingly, however, if a previously processed pickle is so coated, the liquefaction of the interior contents not only does not take place even after the lapse of months of time under ordinary conditions of storage but, moreover, the original taste, flavor and crispness of the processed pickles are maintained to at least a very substantial extent.

I have heretofore adverted to certain advantages which are brought about by my invention over and above those which relate to the marked simplification of the packaging problem and savings which are effected thereby. It will be appreciated that the processed pickle sheathed within its waxy coating is maintained in uncontaminated form until ready to be consumed. When it is desired to consume the processed pickle, the waxy coating is broken in any suitable manner, for example, by slightly flexing the waxed processed pickle, and then peeling away the coating which becomes readily removable. The coating may be removed to only a limited extent at the outset, for instance, from the upper half of the processed pickle, and the waxy coating at the lower half forms a convenient means by which the pickle may be held in the hand without messiness and with the maintenance of a maximum of cleanliness. It may also be noted that my invention makes possible and commercially feasible the marketing of single or individual processed pickles. The cost of glass packaging or similar types of packaging is, obviously, prohibitive unless at least two and usually at least several processed pickles are packaged together.

While my invention has been described in detail, no unnecessary limitations are to be read thereinto, the scope of the invention being set out in the appended claims.

What I claim as new and desire to protect by Letters Patent of the United States is:

1. A processed pickle encased within a sheath of a nontoxic, water-impervious waxy material of appreciable thickness, said pickle being adapted to be dry packed and having the property of maintaining its desired characteristics of flavor, taste and crispness over prolonged periods of time.

2. A processed pickle encased within a sheath of a nontoxic, water-insoluble waxy material of appreciable thickness, said pickle being adapted to be dry packed and having the property of maintaining its desired characteristics of flavor, taste and crispness over prolonged periods of time, the integrity of said sheath being readily broken when the sheathed pickle is slightly flexed whereby said sheath may readily be peeled from said pickle.

3. A processed pickle encased within a sheath of a nontoxic, water-impervious waxy material having a thickness of the order of about 1/25" to about 1/16", said pickle being adapted to be dry packed and having the property of maintaining its desired characteristics of flavor, taste and crispness over prolonged periods of time.

4. A processed pickle encased within a sheath of a nontoxic, water-insoluble waxy material of appreciable thickness, said waxy material consisting of a plurality of independent essentially adhering layers of waxy material, said pickle being adapted to be dry packed and having the property of maintaining its desired characteristics of flavor, taste and crispness over prolonged periods of time, the integrity of said sheath being readily broken when the sheathed pickle is slightly flexed whereby said sheath may readily be peeled from said pickle.

5. A processed pickle encased within a sheath of a nontoxic, water-insoluble waxy material, said waxy material consisting of a plurality of independent essentially adhering layers of waxy material, the thickness of said sheath being of the order of about 1/25" to about 1/16", said pickle being adapted to be dry packed and having the property of maintaining its desired characteristics of flavor, taste and crispness over prolonged periods of time, the integrity of said sheath being readily broken when the sheathed pickle is slightly flexed whereby said sheath may readily be peeled from said pickle.

6. A processed pickle encased within a sheath of a nontoxic, water-insoluble waxy material of appreciable thickness, said waxy material including a plasticizing agent to enhance the flexibility of the wax ingredient thereof, said pickle being adapted to be dry packed and having the property of maintaining its desired characteristics of flavor, taste and crispness over prolonged periods of time, the integrity of said sheath being readily broken when the sheathed pickle is slightly flexed whereby said sheath may readily be peeled from said pickle.

7. A dill pickle encased within a sheath of a nontoxic, water-insoluble waxy material of appreciable thickness, said pickle being adapted to be dry packed and having the property of maintaining its desired characteristics of flavor, taste and crispness over prolonged periods of time, the integrity of said sheath being readily broken when the sheathed pickle is slightly flexed whereby said sheath may readily be peeled from said pickle.

MURRAY M. SCHARF.

REFERENCES CITED

The following references are of record in the file of this patent:

UNITED STATES PATENTS

| Number | Name | Date |
| --- | --- | --- |
| 1,940,530 | Brogden et al. | Dec. 19, 1933 |
| 1,943,468 | Bridgeman et al. | Jan. 16, 1934 |
| 2,007,177 | Brogden | July 19, 1935 |
| 2,343,258 | Hussey | Mar. 7, 1944 |
| 2,354,590 | Gilfillan et al. | July 25, 1944 |
| 2,476,774 | Sears | July 19, 1949 |